United States Patent [19]

DaGue et al.

[11] 4,435,361

[45] Mar. 6, 1984

[54] CORROSION INHIBITION SYSTEM CONTAINING DICYCLOPENTADIENE SULFONATE SALTS

[75] Inventors: Michael G. DaGue; Frederick W. Valone, both of Houston, Tex.

[73] Assignee: Texaco Inc., White Plains, N.Y.

[21] Appl. No.: 420,163

[22] Filed: Sep. 20, 1982

[51] Int. Cl.$^3$ .................. C23F 11/04; C09K 7/00; C04B 9/02; C07F 143/00

[52] U.S. Cl. .................................. 422/12; 422/7; 252/8.55 D; 252/392; 252/363.5; 106/14.13; 260/503; 166/273

[58] Field of Search .................. 252/8.55 E, 392, 395, 252/8.55 D, 363.5; 106/14.13, 14.18, 14.42; 422/12; 260/503, 503.5, 505 C; 166/274, 275, 273

[56] References Cited

U.S. PATENT DOCUMENTS

| | | | |
|---|---|---|---|
| 2,828,259 | 3/1958 | Wirtel | 252/8.55 E |
| 2,888,399 | 5/1959 | Wirtel | 252/8.55 E |
| 3,110,683 | 11/1963 | Steinhauer et al. | 152/389 |
| 3,443,982 | 5/1969 | Kjellmark | 106/14.13 |
| 3,623,979 | 11/1971 | Maddox et al. | 252/8.55 E |
| 3,676,354 | 7/1972 | Kaneko | 422/12 X |
| 3,977,994 | 8/1976 | Geiser | 422/12 X |
| 4,140,724 | 2/1979 | Nyi | 568/665 |

FOREIGN PATENT DOCUMENTS 1363848  8/1974  United Kingdom .............. 260/503

*Primary Examiner*—Richard D. Lovering
*Assistant Examiner*—Catherine S. Kilby
*Attorney, Agent, or Firm*—Robert A. Kulason; Jack H. Park; Harold J. Delhommer

[57] ABSTRACT

A series of novel oil-dispersible corrosion inhibiting solutions are disclosed which contain dicyclopentadiene (3a, 4, 7, 7a-tetrahydro-4, 7 methanoindene) sulfonate salts along with an organic corrosion inhibitor in a low molecular weight solvent. The inhibiting solutions containing dicyclopentadiene sulfonate salts are effective in dramatically reducing corrosion rates in the oil field, especially pitting from hydrogen sulfide.

26 Claims, No Drawings

CORROSION INHIBITION SYSTEM CONTAINING DICYCLOPENTADIENE SULFONATE SALTS

TECHNICAL FIELD OF THE INVENTION

The invention relates to organic inhibitor treating solutions employed to reduce corrosion from the harsh fluid environments encountered in the oil field. More particularly, the invention concerns treating solutions containing dicyclopentadiene sulfonate, which are especially effective in reducing hydrogen sulfide corrosion.

BACKGROUND OF THE INVENTION

Corrosion that occurs in an oil field environment is extremely complex and tends to attack all manner of metal equipment above and below ground. The principle corrosive agents found in the well fluids include hydrogen sulfide, carbon dioxide, oxygen, organic acids and solubilized salts. These agents may be present individually or in combination with each other. Valves, fittings, tubing, pumps, precipitators, pipe lines, sucker rods and other producing equipment are particularly susceptible. Deposits of rust, scale, corrosion by-products, paraffin and other substances create ideal environments for concentration cells. Carbon dioxide and hydrogen sulfide induced pitting is encouraged by such deposits. Acidic condensate that collects on metal tubing will also cause pitting. Extreme temperatures and pressures in downhole environments further accelerate corrosion.

Of all of the types of corrosion that occur in the oil field, pitting corrosion from hydrogen sulfide presents the most serious unsolved problem. Pitting is a form of corrosion that develops in highly localized areas on a metallic surface. It results in the development of cavities or pits that may range from shallow depressions to deep holes which may seriously affect the structural integrity of the metal equipment. Very often as oil fields mature and enhanced recovery methods such as water flooding are instituted, the concentration of hydrogen sulfide in the well fluids increases dramatically. This increase in concentration and its related effect on the extent of pitting corrosion may make older oil fields economically unattractive due to excessive corrosion costs.

Organic corrosion inhibitors are normally employed to control corrosion. But they are not very helpful in reducing pitting corrosion due to hydrogen sulfide.

Various surfactants have been employed for many years to improve the performance of organic corrosion inhibitor systems. Surfactants are generally added to inhibitor systems to perform the different functions of (1) solubilizing the corrosion inhibitor or other active ingredients, (2) cleaning the surface of the metal to be protected or treated, and (3) improving the penetration of the active ingredients into the microscopic pores of the metal. Ethoxylated alcohols and ethoxylated amines are the most common surfactants employed in corrosion inhibition systems. Two examples of such surfactant compounds are provied by U.S. Pat. Nos. 3,110,683 and 3,623,979. U.S. Pat. No. 3,110,683 discloses a series of alkylated, halogenated, sulfonated diphenyl oxides and U.S. Pat. No. 3,623,979 discloses a series of imidazolinyl polymeric acid amides. These representative examples of the prior art are effective in reducing the general effects of corrosion, but like the rest of the prior art, are unable to substantially reduce or eliminate hydrogen sulfide induced pitting.

SUMMARY OF THE INVENTION

A series of oil-dispersible corrosion inhibiting solutions are disclosed which contain various salts of dicyclopentadiene sulfonate in a low molecular weight solvent along with other active ingredients optionally dispersed in the solvent. It has been unexpectedly discovered that the addition of various dicyclopentadiene sulfonates to organic inhibitor systems dramatically reduces corrosion rates in the oil field and practically eliminates pitting due to hydrogen sulfide corrosion.

A preferred corrosion inhibiting solution of the invention contains about 0.25% to about 10%, preferably about 1% to about 10% by weight, of an alkali metal salt, ammonium salt or amine salt of dicyclopentadiene sulfonate, about 65% to about 75% by weight of a low molecular weight solvent, and about 25% to about 35% by weight of an organic inhibitor. The preferred organic inhibitor for the invention solutions is formed by the reaction of a mixture of an amide and an amine or imidazoline with organic acids predominantly having about 15 to 20 carbon atoms per carboxylic acid group at a temperature of about 70° to about 90° C. The amide is preferably formed from the reaction of an alkoxylated amine with a fatty acid and an oxy acid. Other nitrogen-containing molecules can be substituted for the ethoxylated amine herein described. Alternate nitrogen-containing reactants include propoxylated amines, imidazolines, ethoxylated amides or imidazolines, alkyl pyridines, amine oxides and alkoxylated amine oxides.

Metal equipment can be protected through the use of the corrosion inhibiting solutions of the present invention by contacting metal with an effective amount of inhibiting solution containing a dicyclopentadiene sulfonate in either a continuous exposure treatment or a batch filming treatment. Solution concentration should be in the range of 10 ppm to about 200 ppm in a continuous exposure treatment. Higher concentrations should be used in batch filming treatments to create a more durable film.

DETAILED DESCRIPTION

Perhaps the most costly problem in an oil field environment is corrosion of piping and equipment. And the most serious corrosion problem that is not adequately controlled by present corrosion inhibitor systems is pitting due to hydrogen sulfide. The present invention concerns a group of oil-dispersible corrosion inhibiting solutions which are effective in substantially eliminating, or reducing to tolerable limits, hydrogen sulfide pitting.

The present invention is an oil-dispersible corrosion inhibiting solution which comprises about 0.25% to about 10%, preferably about 1% to about 10%, by weight, of a dicyclopentadiene sulfonate salt in a solution having about 65% to about 75% by weight of a low molecular weight solvent. The dicyclopentadiene sulfonate salt may be represented by the formula

wherein D is a dicyclopentadiene moiety, M is a alkali metal, alkaline earth metal or ammonium cation, x is 1 or 2 and y is 0, 1 or 2, provided that y is less than or equal to x. The IUPAC name for dicyclopentadiene is 3a, 4, 7, 7a-tetrahydro-4, 7 methanoindene.

The corrosion inhibiting solution further includes about 25% to about 35% by weight of an organic inhibitor which has been proved effective for controlling corrosion, preferably an organic inhibitor formed by the reaction of an organic acid predominantly having about 2 to about 20, most preferably about 10 to about 20 carbon atoms per carboxylic acid group with a mixture of an amide and an amine or imidazoline.

It has been surprisingly discovered that the addition of small amounts of the salts of dicyclopentadiene sulfonate (about 0.25% to about 10%, preferably about 1% to about 10%, by weight) significantly improves the corrosion inhibiting properties of most organic inhibiting solutions presently used in the oil field. The invention is applicable to all organic inhibitors which are partially water soluble and completely water dispersible in fresh water and synthetic brines at concentrations of less than approximately 1000 ppm.

The dicyclopentadiene sulfonate salt employed in the oil-dispersible corrosion inhibiting solution is a hybrid compound which has certain properties similar to surfactants employed in chemical flooding for enhanced oil recovery. Dicyclopentadiene sulfonate generally acts as hydrotrope increasing the solubility of organic inhibitors. However, at times it decreases the solubility and dispersion of organic components in aqueous or alcoholic mediums. It also gives no response in a mixed indicator, two phase titration test generally used to test for anionic surfactants. Thus, it cannot be strictly considered a surfactant.

When dicyclopentadiene is sulfonated, the product is a mixture of monosulfonate salts, disulfonate salts and sulfinate-sulfonate salts. The structures listed below have several different optical and positional isomers. It is believed that the monosulfonate salts are a mixture of two compounds having the following structures:

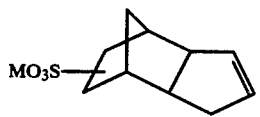

(1)

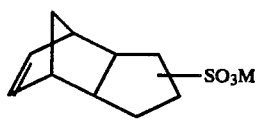

(2)

One possible disulfonate structure is:

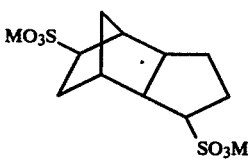

In addition to monosulfonate and disulfonate salts, sulfinate-sulfonate salts may also be present. In such an instance, the sulfinate groups are adjacent to the sulfonate groups. One possible structure is:

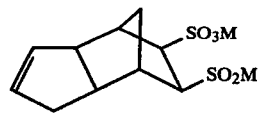

The especially preferred corrosion inhibiting solution of the present invention comprises about 1% to about 4% by weight of the dicyclopentadiene sulfonate salt, about 25% to about 35% of the preferred organic inhibitor, and about 65% to about 75% by weight of a low molecular weight solvent. The solvent is preferably a low molecular weight alcohol such as methanol, ethanol, propanol, isopropanol, butanol, isobutanol or pentanol, or water, or a mixture of alcohol and water. Best results have been achieved with approximately a one to one mixture of isopropanol and water.

It should be noted again that most organic inhibitors presently used in the oil field can be employed in the invention solution containing dicyclopentadiene sulfonate with improved corrosion results as long as the inhibitors are partially water dispersible. The preferred organic inhibitor of the invention solution is formed by reacting about a one to one mixture of an amide and an amine or imidazoline with about 100% to about 120% of the stoichiometric amount of a mixture of organic acids which is needed to neutralize the amide and amine mixture. The organic acids should have predominantly about 2 to about 20, most preferably about 10 to about 20 carbon atoms per carboxylic acid group. The acid neutralization takes place at an elevated temperature of about 70° C. to about 90° C. for about 1 to about 2 hours. The particular amide preferred is formed by the reaction of an propoxylated diamine with about a 2 to 1 mixture of a fatty acid having about 15 to 20 carbon atoms and an oxy acid, respectively.

Many different reactions of similar compounds may be employed to form the preferred organic inhibitor used with the dicyclopentadiene sulfonate salts to form the novel corrosion inhibiting solution. The amide reactant is preferably formed from the reaction of an alkoxylated amine with a fatty acid and an oxy acid. This initial amine should be a predominantly straight chain primary amine having mono, di or tri functionality. A straight chain polyoxypropylene diamine having a molecular weight of about 200 to 250 is most preferred. This diamine is reacted with an organic acid or a mixture of organic acids predominantly having about 10 to about 20 carbon atoms per carboxylic acid group. Fatty acids, dimer-trimer acids and oxy acids (obtained from the oxidation of a hydrocarbon cut), may all be used in this reaction provided they meet the initial criteria of about 10 to about 20 carbon atoms per carboxylic acid group.

Examples of the organic acids include: Pamak WCFA, a trademark for a fatty acid having about 16 to 18 carbon atoms and an acid number of 178 sold by Hercules, Inc.; Arizona 7002, a trademark for a dimer-trimer acid with an acid number of 142 sold by Arizona Chemical Company; and TC-5926, a trademark for an oxy acid made from a lubricating oil cut having an API gravity of about 39° sold by Texaco Chemical Company. Of course, other organic acids fitting the initial criteria of about 10 to about 20 carbon atoms per carboxylic acid groups are suitable.

The amide resulting from the reaction of the propoxylated amine and organic acids is then mixed with an amine or imidazoline compound to form a second mixture. Imidazoline is preferred and the preferred imidazoline is Witcamine 209, a trademark for an imidazoline with an amine number of 214 sold by Witco Chemical Company. Witcamine 210, a trademarked product also sold by Witco Chemical Company and the amide precursor to the Witco 209 imidazoline, may also be used in place of the amine or imidazoline. Some examples of suitable amines are: aliphatic mono- and diamines such as coco-, tallow-, or soyamine, aromatic amines such as aniline, alkoxylated aliphatic or aromatic amines, amine oxides, alkoxylated amine oxides, alkoxylated amides and alkoxylated imidazolines.

The prepared mixture of amide and amine or imidazoline is reacted with an organic acid or a mixture of organic acids to form the final organic inhibitor. Again, the preferred organic acids will have about 10 to about 20 carbon atoms per carboxylic acid group. Organic acid is added in about 85% to about 140%, preferably about 100% to about 120%, of the stoichiometric amount needed to neutralize the mixture of amide and amine or imidazoline. It is especially preferred to use approximately a 3:2:1 mixture of Pamak WCFA (a fatty acid) to TC-5926 (an oxy acid) to Arizona 7002 (a dimer-trimer acid).

The amide and amine mixture can also be neutralized with a mineral acid such as hydrochloric acid or nitric acid instead of the preferred organic acids to form the organic inhibitor. The use of these alternate acids substantially increases the water solubility of the organic inhibitor.

The amounts of each acid in the mixture can be varied considerably to tailor the organic inhibitor product to individual requirements. For instance, an increased quantity of dimer-trimer acid will decrease water solubility, as will an increased concentration of fatty acid. The two particularly preferred fatty acids and dimer-trimer acids, the Pamak WCFA and Arizona 7002 are practically interchangeable. An increased quantity of oxy acid tends to increase dispersibility of the organic inhibitor product within the corrosion inhibiting solution. Without the oxy acid, the low dispersibility of the organic inhibitor in solution results in an insufficiently performing corrosion inhibiting solution. Increased water solubility can also be achieved by substituting any of the previously mentioned acids with a low molecular weight organic acid such as acetic or hydroxyacetic acid or a mineral acid such as hydrochloric acid.

One or more surfactants may also be added to the novel dicyclopentadiene sulfonate inhibiting solutions to increase dispersion and filming. Possible surfactants are ethoxylated nonionic materials and anionic surfactants. However, increased surfactant quantities may also decrease performance of the overall corrosion inhibiting solution.

The corrosion inhibiting solution of the invention which contains dicyclopentadiene sulfonate salt may be employed in many different locations in the oil field. Since the solution offers improvement over present organic inhibitor systems and substantial increases in corrosion protection in sour environments, it may be used to protect downhole piping and equipment in situations such as subsurface water injection for pressure maintenance, water disposal systems, or even drilling applications, as well as in above-ground, oil or water flow lines and equipment.

The invention solution may be employed in both general methods of inhibiting solution treatment, continuous injection and batch. Continuous injection of the inhibitor is preferred because of the filming characteristics of the invention solution. Either method, continuous injection or balch, permits the dicyclopentadiene sulfonate salts and organic inhibitor solution to contact the metal to be protected and form an organic barrier over the metal.

The effectiveness of a given organic inhibitor system generally increases with the concentration, but because of cost considerations, most solutions when fully diluted in their working environment must be effective in quantities of less than about 0.01% by weight (100 ppm). The invention solution is effective throughout the range of about 10 ppm to about 200 ppm in a continuous injection method.

If a batch method is employed, a slug of inhibiting solution should be injected with a dicyclopentadiene sulfonate concentration preferably about 1% to about 10% in a closed system and allowed to remain in contact with the metal to be protected for sufficient time to form a durable film. However, the concentration of dicyclopentadiene sulfonate can be varied considerably over a wide range in batch treatments without significant changes in the performance of the corrosion inhibiting solution. The contact time period should be at least 12 hours, preferably 24 hours. Afterwards, normal production or flow of fluids should be resumed, flushing out excess inhibitor solution. The batch treatment should be repeated when necessary to maintain film durability over the metal to be protected.

If the dicyclopentadiene sulfonate inhibitor system of the present invention is employed in a drilling application, a batch method should be employed. Dicyclopentadiene sulfonate tends to combine with the various materials present in drilling mud systems, reducing the effectiveness of the corrosion inhibiting solution in continuous treatment applications.

At present, an industry established procedure for testing oil field corrosion inhibitors does not exist. Because of widely varying corrosion conditions in the oil field, it is impractical to establish any universal standard laboratory tests. But it is desirable to have tests that are easily duplicated and can approximate the continuous type of liquid and gas exposure that occurs in wells and flowlines in the oil field.

One dynamic test simulating field usage has achieved some following in the industry. The continuous exposure procedure set forth in the January 1968 issue of "Material Protections" at pages 34–35 was followed to test the subject invention. The test offers an excellent indication of the ability of organic corrosion inhibitors to protect metals emersed in either sweet or sour fluids.

GENERAL TEST PROCEDURE

The metal specimens were immersed in sweet or sour fluid environments for seventy-two (72) hours to approximate continuous exposure conditions in the oil field. The sweet fluid test environment was established by gassing the test solution with carbon dioxide. A sour fluid test environment was created by bubbling hydrogen sulfide through the test solution. The specimens were tested in both carbon dioxide and hydrogen sulfide environments with several organic corrosion inhibitor solutions both with and without dicyclopentadiene sulfonate. Tests were additionally run in those environments without any organic corrosion inhibitors placed in the test solutions to give a baseline for comparison purposes.

The metal test specimens were cold-rolled, mild steel coupons which measured three (3) inches by 0.5 inches by 0.005 inches. These coupons were initially cleaned in order to remove any surface film, dried and then weighed.

Four ounce glass bottles were filled with two types of test solutions. The first simulated an oil-brine environment and consisted of 10 milliliters of Texaco EDM fluid, a Texaco trademarked lube oil cut having an API gravity of about 39°, 90 milliliters of a 10% synthetic brine and 1 milliliter of dilute acetic acid. The synthetic brine contained 10% sodium chloride and 0.5% calcium chloride by weight. The second test solution simulated a brine environment and was composed of 100 milliliters of the same 10% synthetic brine and 1 milliliter of acetic acid. The oil-brine and brine test solutions were then gassed for 5 to 10 minutes with carbon dioxide to create a sweet test environment or hydrogen sulfide to create a sour test environment. The solution gassing was designed to remove any dissolved oxygen as well as create the sweet or sour environment.

Next, 100 parts per million of a selected organic corrosion inhibitor were added to the gased bottles. Each inhibitor addition was made from a standard solution of known concentration. Dicyclopentadiene sulfonate was present in certain of the organic inhibitor solutions.

The steel test coupons were then placed within the bottles. The bottles were capped and mounted on the spokes of a 23 inch diameter, vertically mounted wheel and rotated for 72 hours at 30 rpm inside an oven maintained at 120° F. The coupons were removed from the bottles, washed and scrubbed with dilute acid for cleaning purposes, dried and weighed. The corrosion rate in mils per year (mpy) was then calculated from the weight loss. One mpy is equivalent to 0.001 inches of metal lost per year to corrosion. Additionally, the test coupons were visually inspected for the type of corrosive attack, e.g., hydrogen blistering, pitting and crevice corrosion or general corrosion.

The organic inhibitor solutions employed in the examples were comprised of about 27% organic inhibitor, about 3% dicyclopentadiene sulfonate and surfactant, and about 70% solvent. The solvent was a one to one mixture by weight of isopropyl alcohol and water.

The organic inhibitor of the examples was prepared by reacting an ethoxylated polyoxypropylene diamine having an average molecular weight of about 250 with a two to one mixture of Pamak WCFA (fatty acid) and TC-5926 (oxy acid) at approximately 160° C. to form a amide. The amide product was then mixed with Witcamine 209 (imidazoline) in a one to one proportion and reacted with a mixture of organic acids at approximately 80° C. for 1.5 hours. The second mixture of organic acids was comprised of Pamak WCFA, TC-5926 and Arizona 7002 in approximately a 3:2:1 mixture in quantities needed to effect an 85% neutralization and a 115% neutralization of the amide and imidazoline mixture. A reaction solvent of isopropyl alcohol and water in a one to one mixture by weight was employed in the reaction vessel.

One milliliter of the reaction mixture was diluted with 99 milliliters of isopropyl alcohol to give a concentration of 10,000 ppm in a stock solution. A dicyclopentadiene sulfonate sodium salt was added to the stock solution in the concentration specified. In Examples 2 and 4, a small quantity of an anionic surfactant sold under the trademark M-320 by Texaco Chemical Co. was also added. Finally, one milliliter of the diluted solution containing dicyclopentadiene sulfonate was added to the 100 ml test bottles for each example, leaving a final concentration of 100 ppm of inhibitor solution for each test example.

The following examples will further illustrate the novel corrosion treating solutions of the present invention containing dicyclopentadiene sulfonate. These examples are given by way of illustration and not as limitations on the scope of invention. Thus, it should be understood that materials present in the corrosion treating solutions may be varied to achieve similar results within the scope of the invention.

EXAMPLES 1–5

Similar organic corrosion inhibitor solutions were employed in each example. The only differences were the amount of surfactant and dicyclopentadiene sulfonate employed in each of the four inhibitor solutions and the percent neutralization of the organic inhibitor. Table I identifies the contents of the four inhibitor solutions. Corrosion tests without corrosion inhibiting solution were run for Example 5.

All tests were conducted according to the general procedure previousy set forth. Table II lists the corrosion results determined by measurements of weight loss in the respective sweet and sour environments in both oilbrine and brine test solutions. In each case, tests were run with and without the addition of dicyclopentadiene sulfonate to the organic inhibitor treating solutions. The corrosion values in mils per year set forth in parenthesis are the rates of corrosion of the test specimens in the test solutions with the respective organic inhibitor solutions, but without the dicyclopentadiene sulfonate sodium salt.

In almost every case, the addition of about 1% to about 3% dicyclopentadiene sulfonate to the organic inhibitor solutions substantially decreased the corrosion attributable to the sweet and sour fluid test environments. In many of the hydrogen sulfide test solutions, corrosion rates were cut in half. Furthermore, apart from the reduction of general corrosion rate, there was nearly a complete elimination of pitting attack on the test specimens with the organic inhibitor treatment solutions containing dicyclopentadiene sulfonate. This elimination of hydrogen sulfide pitting was observed even in the all brine hydrogen sulfide environments of Examples 3 and 4 where there were not significant reductions in the general corrosion rate.

Example 5 was run to demonstrate the high corrosion rates of the metal coupons in the same sweet and sour environments.

TABLE I

| INHIBITOR FOR EXAMPLES | % NEUTRALIZED | | |
|---|---|---|---|
| 1 | 110% | 2.5% | Dicyclopentadiene Sulfonate (DCPDS) |
| 2 | 110% | 1% | DCPDS |
|   |      | 2% | M-320 |
| 3 | 85%  | 3% | DCPDS |
| 4 | 85%  | 1% | DCPDS |
|   |      | 2% | M-320 |

TABLE II

| EXAMPLE | 100 PPM INHIBITOR IN OIL-BRINE | | 100 PPM INHIBITOR IN ALL BRINE | |
|---|---|---|---|---|
| | $CO_2$ | $H_2S$ | $CO_2$ | $H_2S$ |
| 1 | 4.1 mpy | 2.8 | 4.2 | 2.3 |
| | (5.5)* | (5.8) | (5.4) | (5.1) |
| 2 | 4.2 | 2.5 | 4.0 | 1.1 |
| | (5.5) | (5.8) | (5.4) | (5.1) |
| 3 | 3.8 | 1.2 | 4.2 | 1.2 |
| | (5.2) | (4.3) | (5.1) | (1.4) |
| 4 | 4.6 | 4.0 | 4.8 | 1.5 |
| | (5.2) | (4.3) | (5.1) | (1.4) |
| 5 | 12.1 | 50.8 | 13.6 | 55.2 |
| (No Inhibitor) | | With Blisters & Pitting | | |

*Values in parentheses are corrosion rates of coupons in inhibiting solution without dicyclopentadiene sulfonate.

EXAMPLES 6-9

The tests of Examples 1-5 were repeated to duplicate a continuous exposure environment for Examples 6-9. The organic inhibitor of Example 1 was used in each case. Only the concentration of dicyclopentadiene sulfonate was changed.

The results listed in Table III indicate that the corrosion inhibiting solutions decreased corrosion up to a concentration of at least about 10% dicyclopentadiene sulfonate. Again, the inhibiting solutions were particularly effective in sour $H_2S$ environments in eliminating pitting attack.

In actual use in the field, cost considerations are frequently paramount. Because of lower cost, a corrosion inhibiting solution having a lower concentration of active ingredients is preferred to a solution having a higher concentration of active ingredients even though the higher concentration solution may be more effective. Thus, the especially preferred solutions of the present invention contain about 1% to about 4% dicyclopentadiene sulfonate.

TABLE III

| EXAMPLE | INHIBITOR SOLUTIONS | 100 PPM INHIBITOR IN OIL-BRINE | | 100 PPM INHIBITOR IN ALL BRINE | |
|---|---|---|---|---|---|
| | | $CO_2$ | $H_2S$ | $CO_2$ | $H_2S$ |
| 6 | Inhibitor of Example 1 2.5% DCPDS | 2.2 mpy | 3.7 | 4.9 | 0.8 |
| 7 | Inhibitor of Example 1 with 4% DCPDS Instead of 2.5% DCPDS | 5.4 | 1.6 | 4.8 | 1.1 |
| 8 | Inhibitor of Example 1 with 7% DCPDS | 3.8 | 2.0 | 4.8 | 1.3 |
| 9 | Inhibitor of Example 1 with 10% DCPDS | 4.2 | 3.2 | 5.0 | 1.0 |

Many other variations and modifications may be made in the concept described above by those skilled in the art without departing from the concept of the present invention. Accordingly, it should be clearly understood that the concepts disclosed in the description are illustrative only and are not intended as limitations on the scope of the invention.

We claim:

1. An oil-dispersible corrosion inhibiting solution comprising about 0.25% to about 10% by weight of a compound represented by the formula $$DH_x(SO_3M)_x(SO_2M)_y$$

wherein D is a dicyclopentadiene moiety, M is an alkali metal, alkaline earth metal or ammonium cation, x is 1 or 2 and y is 0, 1 or 2, provided that y is less than or equal to x.

2. The corrosion inhibiting solution of claim 1, further comprising an organic inhibitor formed by the reaction of a mineral acid with a mixture of an amide and an amine.

3. The corrosion inhibiting solution of claim 1, further comprising an organic inhibitor formed by the reaction of an organic acid predominantly having about 2 to about 20 carbon atoms per carboxylic acid group with a mixture of an amide and an amine.

4. The corrosion inhibiting solution of claim 3 wherein the amine is an aliphatic monoamine, aliphatic diamine, aromatic amine, alkoxylated aliphatic amine, alkoxylated aromatic amine, amine oxide, alkoxylated amine oxide or imidazoline.

5. The corrosion inhibiting solution of claim 4, wherein the diamine is cocoamine.

6. The corrosion inhibiting solution of claim 4, wherein the diamine is tallowamine.

7. The corrosion inhibiting solution of claim 4, wherein the diamine is soyamine.

8. The corrosion inhibiting solution of claim 4, wherein the aromatic amine is aniline.

9. The corrosion inhibiting solution of claim 3, wherein said organic acid is a mixture of organic acids predominantly having about 2 to about 20 carbon atoms per carboxylic acid group.

10. The corrosion inhibiting solution of claim 3, wherein the organic acid is a fatty acid, an oxyacid or a dimer-trimer acid.

11. The corrosion inhibiting solution of claim 3, wherein the amide is the reaction product of a fatty acid having about 10 to about 20 carbon atoms, an oxyacid and an alkoxylated amine.

12. The corrosion inhibiting solution of claim 11, wherein the alkoxylated amine is a diamine having an average molecular weight of about 200 to about 250.

13. The corrosion inhibiting solution of claim 3, wherein the organic acid is reacted with the mixture of an amide and an amine at about 60° to about 100° C.

14. The corrosion inhibiting solution of claim 13, wherein the time of reaction is about 1 to 3 hours.

15. The corrosion inhibiting solution of claim 3, wherein the amount of organic acid reacted with the amide and amine mixture is about 75% to about 130% of the stoichiometric amount needed to react with the amide and amine mixture.

16. The corrosion inhibiting solution of claim 3, wherein the organic inhibitor comprises about 20% to about 35% by weight of the corrosion inhibiting solution.

17. The corrosion inhibiting solution of claim 1 or 3 wherein a low molecular weight alcohol is employed as a solvent.

18. The corrosion inhibiting solution of claim 17, wherein the low molecular weight alcohol is methanol, ethanol, propanol, isopropanol, butanol, isobutanol or pentanol.

19. The corrosion inhibiting solution of claim 1 or 3, wherein a mixture of a low molecular weight alcohol and water is employed as a solvent.

20. The corrosion inhibiting solution of claim 19, wherein the solvent comprises about 60% to about 80% by weight of the corrosion inhibiting solution.

21. An oil-soluble corrosion inhibiting solution comprising:
about 1% to about 10% by weight of a compound represented by the formula

$$DH_x(SO_3M)_x(SO_2M)_y$$

wherein D is a dicyclopentadiene moiety, M is an alkali metal, alkaline earth metal or ammonium cation, x is 1 or 2 and y is 0, 1 or 2, provided that y is less than or equal to x;
about 65% to about 75% by weight of about a one to one mixture of a low molecular weight alcohol and water; and
about 25% to about 35% by weight of an organic inhibitor formed by the reaction of about a one to one mixture of imidazoline and an amide with about 100% to about 120% of the stoichiometric amount of a mixture of organic acids needed to neutralize the imidazoline and amide at a temperature of about 70° to about 90° C. for about one to about two hours,
said amide formed by the reaction of an ethoxylated diamine with about a two to one mixture of a fatty acid having about 15 to 20 carbon atoms and an oxyacid,
said mixture of organic acids being approximately a three to two to one mixture of a fatty acid having about 15 to 20 carbon atoms, an oxyacid and a dimer-trimer acid having about 15 to 20 carbon atoms per carboxylic acid group, respectively.

22. The corrosion inhibiting solution of claim 21, wherein the proportion of oxyacid in the mixture of organic acids is varied to vary the dispersion properties of the corrosion inhibiting solution.

23. A method of protecting metals from corrosive agents in hydrocarbon and aqueous fluids which comprises contacting the metal with an effective amount of a compound represented by the formula

$$DH_x(SO_3M)_x(SO_2M)_y,$$

wherein D is a dicyclopentadiene moiety, M is an alkali metal, alkaline earth metal or ammonium cation, x is 1 or 2 and y is 0, 1 or 2, provided that y is less than or equal to x.

24. The method of claim 23, wherein said compound is mixed with fluids so that a concentration of about 10 ppm to about 200 ppm of said compound continuously contacts the metal.

25. The method of claim 24, wherein said compound is mixed in a solution comprising:
about 1% to about 3% by weight of said compound;
about 60% to about 80% by weight of a low molecular weight solvent; and
about 20% to about 35% by weight of organic inhibitor formed by the reaction of an organic acid predominantly having about 10 to about 20 carbon atoms per carboxylic acid group with a mixture of an amine and an amide at elevated temperature.

26. The method of claim 23, further including the steps of:
contacting the metal to be protected with said compound for a time sufficient to form a durable film over the surface of the metal, preferably at least 12 hours; and
repeating the film forming metal contact treatment when necessary to maintain the film.

* * * * *